United States Patent
Scoville

(10) Patent No.: US 6,732,445 B1
(45) Date of Patent: *May 11, 2004

(54) PIPE FITTING APPARATUS, METHOD, AND PRODUCT-BY PROCESS FOR TAKING SIMULTANEOUS LINEAR AND ANGULAR MEASUREMENTS

(76) Inventor: David Scoville, 14 Crossett Rd., Geneseo, NY (US) 14454

( * ) Notice: Subject to any disclaimer, the term of this patent is extended or adjusted under 35 U.S.C. 154(b) by 0 days.

This patent is subject to a terminal disclaimer.

(21) Appl. No.: 10/249,540

(22) Filed: Apr. 17, 2003

Related U.S. Application Data

(63) Continuation of application No. 09/644,763, filed on Aug. 23, 2000, now Pat. No. 6,550,156.

(51) Int. Cl.[7] .............................. G01B 3/08; G01C 9/02
(52) U.S. Cl. .............................. 33/809; 33/645; 33/371
(58) Field of Search .................... 33/1 N, 354, 370, 33/371, 374, 412, 529, 542, 555.3, 613, 645, 809

(56) References Cited

U.S. PATENT DOCUMENTS

| | | | |
|---|---|---|---|
| 2,122,840 A | 7/1938 | Hafen | 33/613 |
| 2,714,255 A | 8/1955 | Glazer | 33/286 |
| 2,832,152 A | 4/1958 | Blackshaw | 33/529 |
| 3,762,058 A | 10/1973 | Heater | 33/809 |
| 4,044,469 A | 8/1977 | Posey | 33/471 |
| 4,099,331 A | 7/1978 | Peterson et al. | 33/451 |
| 4,120,095 A | 10/1978 | Lebourg | 33/529 |
| 4,202,108 A | 5/1980 | Adams, Jr. et al. | 33/379 |
| 4,338,725 A | 7/1982 | Martin et al. | 33/529 |
| 4,399,616 A | 8/1983 | Jansson | 33/809 |
| 4,476,635 A | 10/1984 | Hart | 33/228 |
| 4,528,757 A | 7/1985 | McKeehan et al. | 33/529 |
| 4,559,716 A | 12/1985 | Daughtry et al. | 33/529 |
| 4,586,264 A | 5/1986 | Zatezalo | 33/412 |
| 5,249,365 A | 10/1993 | Santiago | 33/374 |
| 5,655,309 A | 8/1997 | Hadrami | 33/390 |
| 5,956,855 A | 9/1999 | Foss et al. | 33/391 |
| 6,550,156 B1 | 4/2003 | Scoville | |

*Primary Examiner*—G. Bradley Bennett
(74) *Attorney, Agent, or Firm*—Jay R. Yablon

(57) ABSTRACT

A pipe fitting method and apparatus for taking simultaneous linear and angular measurements is used for pipefitting. A first pipe joint fitting of a pipe fitting apparatus herein disclosed is attached to a first pipe joint, a second pipe joint fitting of the pipe fitting apparatus is attached to a second pipe joint, and the first pipe joint is attached to a first unconnected end of a first pipe-to-be-joined. Then, the pipe fitting apparatus is extended to an extended length thereof, while an angle measuring device of the pipe fitting apparatus simultaneously maintains an angular reading at a preselected joinder angle, until a top open end of the second pipe joint aligns with a second pipe-to-be-joined at an alignment line. Next, it is determined where to cut the second pipe-to-be-joined with reference to the alignment line. Finally, it is determined how long to cut a third connecting pipe with reference to the extended length of the pipe fitting apparatus.

13 Claims, 6 Drawing Sheets

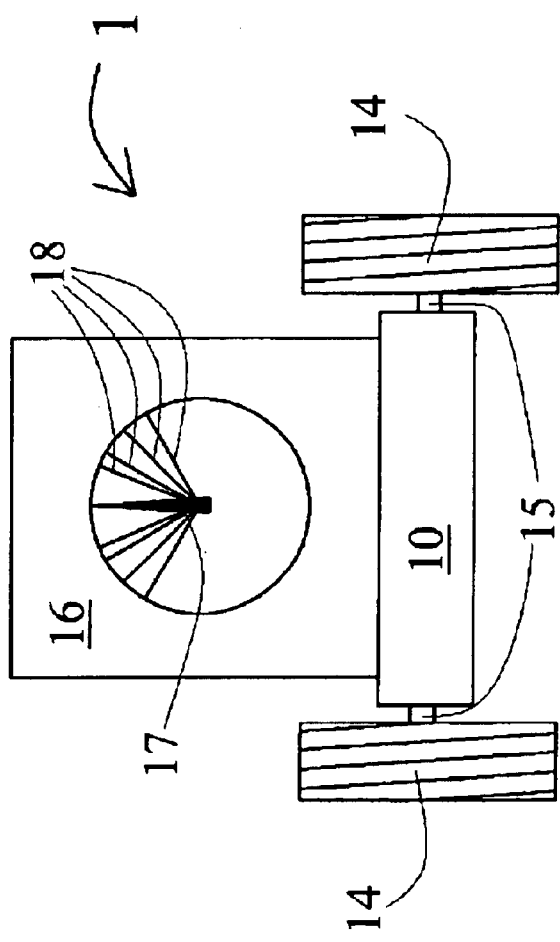
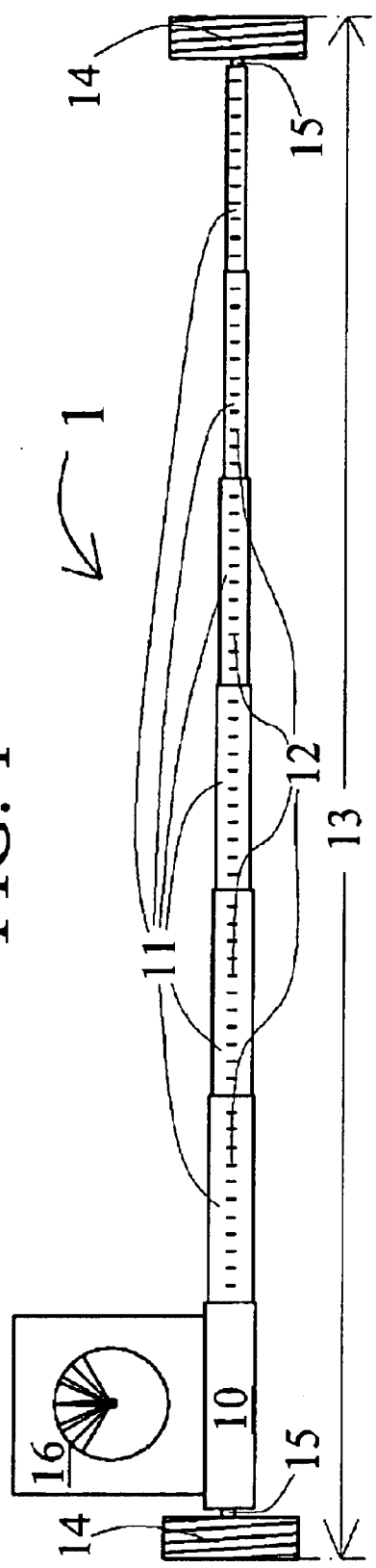
FIG. 1
FIG. 2

PIPE FITTING APPARATUS, METHOD, AND PRODUCT-BY PROCESS FOR TAKING SIMULTANEOUS LINEAR AND ANGULAR MEASUREMENTS

CROSS REFERENCE TO RELATED APPLICATIONS

This application is a continuation of application Ser. No. 09/644,763 filed Aug. 23, 2000, now U.S. Pat. No. 6,550,156 issued Apr. 22, 2003.

BACKGROUND OF INVENTION

This disclosure relates to the general field of pipe fitting and pipe cutting, particularly for plumbing, and discloses a device and method to simplify the process of measuring the distance and determining the level between two pipes to be joined with a third connecting pipe, so as to facilitate the proper cutting of these pipes.

Plumbing of course fundamentally involves the fitting, cutting, and interconnection of multiple pipes into an overall network of pipes. Frequently during any plumbing job, it is necessary, for example, to make a lateral pipe connection between two substantially vertical pipes the ends of which are separated from each other by an unknown linear distance and angle. Because pipe joints (pipe fittings) are generally manufactured to orient the pipes which they laterally interconnect at angles of 22.5 degrees, 30 degrees, 45 degrees, or 60 degrees, the plumber will first determine which of these pipe joint angles is to be selected for the particular connection. Second, the plumber will determine and mark a position at which to cut one or both of the vertical pipes (vertical pipe cut), so that their cut ends are oriented with respect to one another at the selected pipe joint angle. This generally requires taking an angular measurement between the ends of the two vertical pipes, and is complicated by the fact that it is necessary to account as well for the non-zero dimensions of the pipe joints themselves. Third, after this vertical pipe cut, the plumber needs to determine and mark the length at which to cut the pipe which laterally interconnects the cut ends of these two vertical pipe ends (lateral pipe cut). This generally requires taking a linear measurement between the now-cut ends of the two vertical pipes, and is complicated by the fact that here too, it is necessary to account for the dimensions of the pipe joints themselves. It is also to be observed that this linear measurement is taken separately from the earlier angular measurement. Finally, the laterally-connecting pipe is cut to the length determined by this linear measurement, and is used to connect together the two vertical pipes via the selected pipe joints. Hopefully, this process occurs once for any given interconnection. Often, however, because of the difficulties in properly taking these angular and linear measurements, one or more of these cuts is incorrectly made, and time and material is then wasted having to do the same thing over a second time, or even more times.

It would be desirable to simplify this process by providing a device and method for simultaneously taking both of these required angular and linear measurements together at the same time, while simultaneously accounting more precisely for the non-zero dimensions of the pipe joints, in such a way that the proper positions for these vertical and lateral cuts can be simultaneously determined in their proper relation to one another.

The U.S. patent literature does disclose a limited number of geometrical instruments for simultaneously taking angular and linear measurements for specific applications. For example, commonly-assigned U.S. Pat. Nos. 4,528,757 and 4,559,716 appear to disclose a method and apparatus for "determining the distance and angular orientation between two structurally unconnected members," (abstracts) and are particularly suited for measuring undersea pipelines. U.S. Pat. No. 4,120,095 also discloses what appears to be a similar, though much more complex, apparatus and method, which is also particularly suited for measuring undersea pipelines.

Other U.S. Patent documents defining the general state of the art are as follows:

U.S. Pat. Nos. 4,044,469 and 4,476,635 disclose combined tape measure and angle measuring instruments.

U.S. Pat. No. 4,338,725 discloses a pipe fitter's quick square instrument, used for taking angle measurements only.

U.S. Pat. No. 5,249,365 discloses a telescoping level.

U.S. Pat. No. 4,399,616 discloses a telescoping measuring rule.

None of these patents, however, is at all well-suited for ordinary pipe fitting, separately or in combination. Further, these patents do not in any way disclose or suggest: how to select a suitable joinder angle for connecting two unconnected ordinary plumbing pipes or similar conduits; how to measure the linear distance between these two unconnected pipes at the locations where these pipes are to be interconnected, for the selected joinder angle, so as to maintain this joinder angle simultaneously with taking this linear distance measure; how to measure where to cut these two pipes for interconnection at the selected joinder angle; how to measure how long to cut a third pipe to join these two pipes; how to take all of these measurements and make all these cuts to account fully for the geometric size and configuration of the pipe joints used to interconnect all of these pipes; and how to provide a simple, low-cost apparatus that enables all of the foregoing measurements to be easily taken.

It is therefor desirable to provide an apparatus and method which enables the user thereof to determine where to cut one or both vertical pipes, and simultaneously to determine how long to cut a lateral connecting pipe to interconnect these two vertical pipes, in order to establish a lateral connection between these vertical pipes at a predetermined angular orientation.

It is further desirable for this apparatus and method to account fully for the non-zero dimensions (geometric size and configuration) of the pipe joints used to connect each vertical pipe to the ends of the lateral pipe.

It is further desirable for this apparatus and method to easily accommodate a wide variety of pipe and pipe joint widths.

SUMMARY OF INVENTION

A pipe fitting apparatus and method for taking simultaneous linear and angular measurements is used for pipefitting. A first pipe joint fitting of a pipe fitting apparatus herein disclosed is mated to a first pipe joint, a second pipe joint fitting of the pipe fitting apparatus is attached to a second pipe joint, and the first pipe joint is attached to a first unconnected end of a first pipe-to-be-joined. The pipe fitting apparatus is then extended to reach an extended length thereof, while an angle measuring device of the pipe fitting apparatus simultaneously maintains an angular reading at a preselected joinder angle, until a top open end of the second pipe joint aligns with a second pipe-to-be-joined so as to define an alignment line. A second pipe cut line is then determined at which to cut the second pipe-to-be-joined with reference to the alignment line, and it is determined how long to cut a third connecting pipe with reference to the extended length of the pipe fitting apparatus.

BRIEF DESCRIPTION OF DRAWINGS

The features of the invention believed to be novel are set forth in the appended claims. The invention, however, together with further objects and, advantages thereof, may best be understood by reference to the following description taken in conjunction with the accompanying drawing(s) in which:

FIG. 1 is a plan view illustrating a first preferred embodiment of a pipe fitting apparatus, in a fully contracted state, utilizing continuous gravitationally-based angular measurements.

FIG. 2 is a plan view illustrating the invention embodiment of FIG. 1 in a fully extended state.

DETAILED DESCRIPTION

Figure 3:
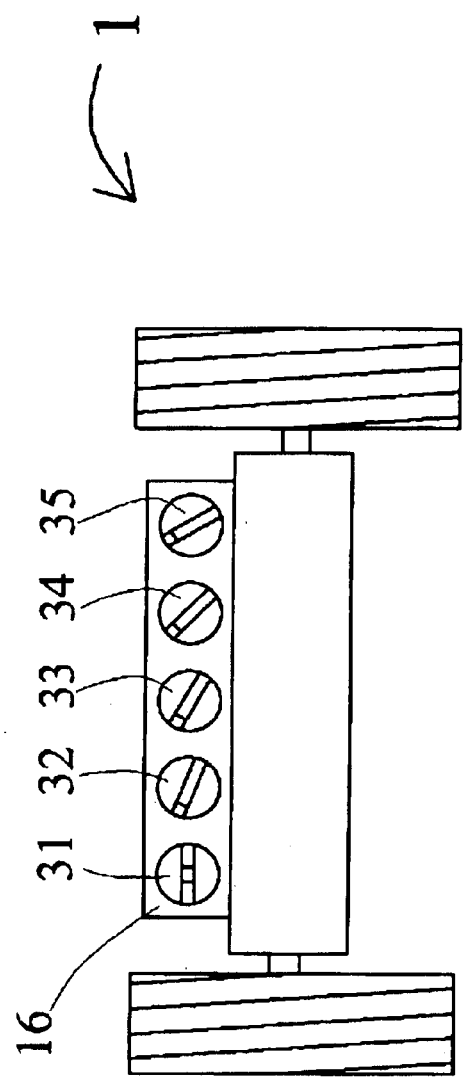
FIG. 3 is a plan view illustrating a second preferred embodiment of a pipe fitting apparatus, in a fully contracted state, utilizing discrete gravitationally-based angular measurements.

FIG. 1 illustrates a first preferred embodiment of the invention in a fully contracted state, while FIG. 2 illustrates this same embodiment in a fully extended state. A pipe fitting apparatus 1 according to this embodiment comprises an extendable linear measuring device 10 in turn comprising at least one telescoping section 11, and preferably, distance determination means 12 such as the illustrated linear marking rules for determining an extended length 13 of pipe fitting apparatus 1 from one end to the other in any given state of extension. (As illustrated in FIG. 1, pipe fitting apparatus 1 is in a maximum state of extension, i.e., extended length 13 is extended to a maximum extended length.) Each end (first and second ends) of linear measuring device 10 comprises a pipe joint fitting 14 attached 15 thereto. Pipe joint fittings 14 are capable of mating into a standard pipe joint similarly to a standard pipe. Pipe joint fittings 14 can be screw threaded as shown, or, alternatively, may comprise, for example not limitation, rubber, plastic (injection molded or otherwise), cork, or a similar material which is firm and yet capable of a slight degree of compression with sufficient friction, so that When a pipe joint is slid over pipe joint fittings 14, the pipe joint slides easily yet firmly over pipe joint fittings 14 by hand, is securely maintained in place while pipe fitting apparatus 1 is used for measuring as detailed below, and then slides easily off of pipe fitting apparatus 1, by hand, once the measurement is completed. For reference, the leftmost fitting illustrated in FIGS. 1 through 4 will be referred to as first pipe joint fitting 14 while the rightmost fitting will be referred to as second pipe joint fitting 14. If pipe joint fittings 14 comprise the screw threading illustrated in FIGS. 1 through 4, then pipe joint fittings 14, linear measuring device 10, and telescoping sections 11 are all interconnected with one another such that pipe joint fittings 14 can be separately rotated (screwed) relative to one another. Linear measuring device 10 and telescoping sections 11, in any given state of extension, preferably comprises a substantially rigid linear measuring device, as contrasted, for example, with non-rigid or semi-rigid measuring devices such as tape measures.

Affixed to linear measuring device 10 is a gravitationally-based angle measuring device 16 comprising a continuous angle indicator 17 that moves under force of gravity as angle measuring device 16 and the linear measuring device 10 to which it is attached are rotated. Angle determination means 18 such as the indicated angular marking rules allow the user to determine the angle of linear measuring device 10 by observing where angle indicator 17 falls relative to angle determination means 18. In FIGS. 1 and 2, as an example, linear measuring device 10 is shown to be horizontal (zero degrees), and continuous angle indicator 17, which always points vertically upward with respect to gravity, points toward an angular marking rule that indicates this horizontal orientation of zero degrees. Also shown in FIGS. 1 and 2 are angular marking rules 18 for Â±22.5 degrees, Â±30 degrees, Â±45 degrees, and Â±60 degrees, which, it is to be recalled, are the angles at which pipe joints are generally manufactured to orient pipes to which they are laterally interconnected.

While angular marking rules 18 are shown at Â±22.5 degrees, Â±30 degrees, Â±45 degrees, and Â±60 degrees, it is to be observed that continuous angle indicator 17 in FIGS. 1 and 2 is a continuous rotation device, i.e., that it can be used to measure any angular orientation along a continuous scale and not just at the discreet angular orientations signified by the marking rules 18 which are illustrated. Thus, marking rules 18 can be provided for a full 360 degree rotational scale, not merely the particular marking rules 18 that are shown.

Figure 4:
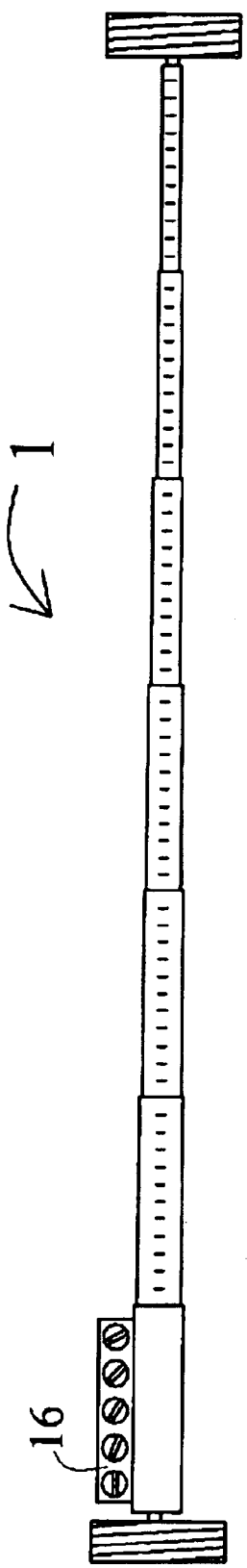
FIG. 4 is a plan view illustrating the invention embodiment of FIG. 3 in a fully extended state.

FIG. 3 illustrates a second preferred embodiment of the invention in a fully contracted state, while FIG. 4 illustrates this same embodiment in a fully extended state. The embodiments of FIGS. 3 and 4 are respectively identical to those of FIGS. 1 and 2, except for the fact that in FIGS. 3 and 4, continuous angle indicator 17 of gravitationally-based angle measuring device 16is replaced by several discrete angle indicators 31, 32, 33, 34, and 35 fixed within angle measuring device 16. These discrete angle indicators, preferably, are the same "plumb bubble tubes" that are well known and widely used in conventional leveling devices. Discrete angle indicator 31 is fixed within angle measuring device 16 so as to show a centered bubble when linear measuring device 10 to which angle measuring device 16 is attached is oriented at a horizontal, zero degree orientation. Discrete angle indicator 32 will show level when linear measuring device 10 is oriented at 22.5 degrees from level. Similarly, discrete angle indicators 33, 34, and 35 will show level at respective 30, 45 and 60 degree orientations. Again, it is to be noted that these are the angles at which pipe joints are generally manufactured to orient pipes to which they are laterally interconnected.

Alternatively, for example, angle measuring device 16 can comprise a single, rotatable discrete angle indicator 31 which can be rotated within angle measuring device 16 to a preselected angular orientation as desired, including but not limited to 22.5, 30, 45 and 60 degrees, prior to using pipe fitting apparatus 1 for a particular pipe fitting operation in the manner to be further detailed below. With this alternative, at any such preselected angular orientation, pipe fitting apparatus 1 can only measure level at that single, preselected, discrete angle. But the range of single, preselected, discrete angles for which pipe fitting apparatus 1 can then be used becomes unrestricted.

In FIGS. 5 through 13, we turn now to the method by which pipe fitting apparatus 1 is used for pipe fitting. In these figures, the pipe fitting apparatus 1 embodiment of FIGS. 3 and 4 is used for illustration, but it is understood that the embodiment of FIGS. 1 and 2, and all other equivalent embodiments that may occur to someone of ordinary skill, would also be used in a similar manner within the scope of this disclosure and its associated claims.

Figure 5:
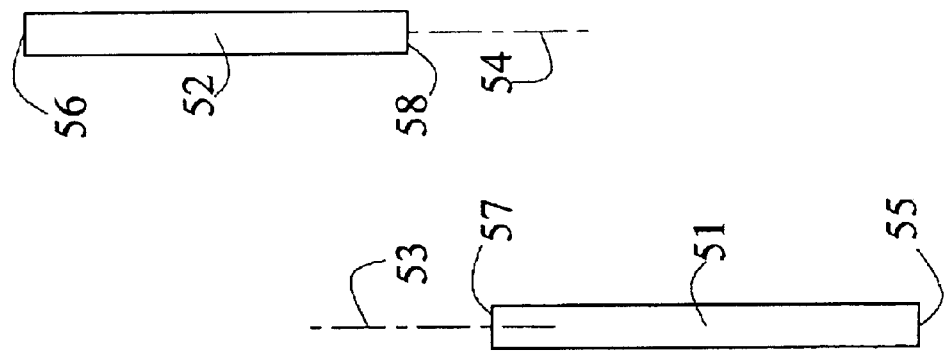

FIG. 5 illustrates a first pipe-to-be-joined 51 and a second pipe-to-be-joined 52. These two pipes-to-be-joined 51 and 52 are illustrated to be substantially vertically oriented, but it is understood that in practice, the apparatus and method disclosed herein can be employed to join any two pipes together within the scope of this disclosure and its associated claims, regardless of the orientation of the two pipes-to-be-joined 51 and 52 First pipe-to-be-joined 51 and second pipe-to-be-joined 52 are laterally displaced from one another as illustrated, and are to be joined together by a third connecting pipe (101 in FIG. 10), using suitable pipe joints. The use of the term "laterally displaced" herein is understood and should be interpreted to mean that these first and second pipes-to-be-joined 51 and 52 are displaced from one another such that that a first pipe axis 53 running lengthwise through the center of first pipe-to-be-joined 51 is not co-linear with a second pipe axis 54 running lengthwise through the center of second pipe-to-be-joined 52. It is assumed that first and second pipes-to-be-joined 51 and 52 are fully in place prior to being joined together, i.e., that first pipe-to-be-joined 51 is already connected to some other plumbing at a first pipe pre-connected end 55 thereof, and that second pipe-to-be-joined 52 is already connected to some other plumbing at a second pipe pre-connected end 56 thereof. However, the use of this apparatus and method to connect two pipes together one or both of which are not pre-connected in this way is also considered to be within the scope of this disclosure and its associated claims. Also illustrated are a first unconnected end 57 of first pipe-to-be-joined 51 and a second unconnected end 58 of second pipe-to-be-joined 52.

Figure 6:
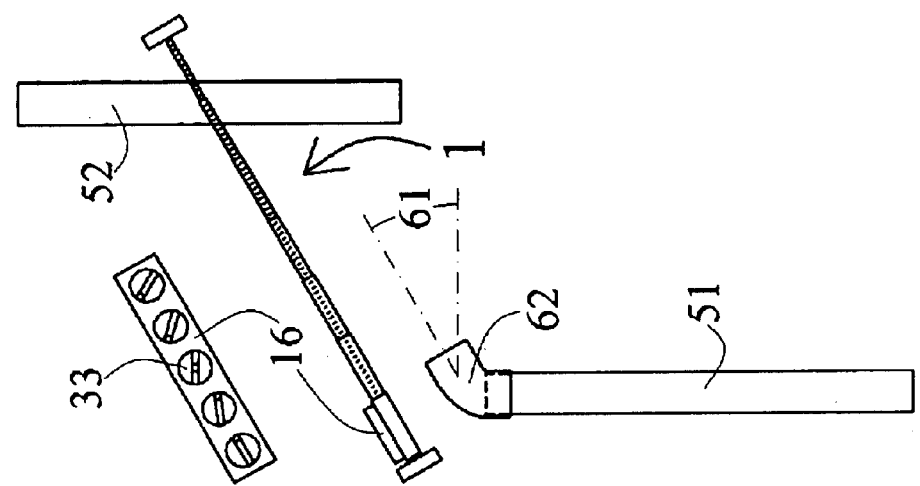

For the first step, illustrated in FIG. 6, pipe fitting apparatus 1 (shown fully extended) and its angle measuring device 16 are used to select a joinder angle 61 at which first and second pipes-to-be-joined 51 and 52 are to be joined. In this step, angle measuring device 16 is used to take a rough, not exact, measure of the angle between the unconnected ends 57 and 58 of first and second pipes-to-be-joined 51 and 52. An experienced practitioner may even be able to select joinder angle 61 by eye, without using angle measuring device 16 at all. Assuming the availability of standard 22.5 degree, 30 degree, 45 degree, or 60 degree pipe joints, joinder angle 61 will be selected to be one of these four angles (or zero degrees, for a substantially horizontal interconnection). However, this should not be interpreted to limit this disclosure and its associated claims, since this apparatus and method can be used for any joinder angle 61 from zero to ninety degrees, as well as for any angle of pipe joint. For the purpose of this illustration and following discussion, a 30 degree joinder angle 61 will be selected to join first and second pipes-to-be-joined 51 and 52. It is to be noted that in the enlargement of angle measuring device 16, the plumb bubble of 30-degree angle indicator 33 is therefore centered, while the remaining plumb bubbles are not.

Once joinder angle 61 is selected, a first pipe joint 62 is temporarily attached (but not yet welded or otherwise permanently fixed) to first pipe-to-be-joined 51. For this temporary attachment, first pipe joint 62 and first pipe-to-be-joined 51 can be screwed together if they comprise mating screw threads. If not, first pipe joint 62 is slid over first pipe-to-be-joined 51 in a temporary connection. If needed, some optional frictional materials can be employed between first pipe joint 62 and first pipe-to-be-joined 51 to better secure this temporary connection. In FIG. 6, first pipe joint 62 actually comprises a bend angle (elbow) of 120=90+30 degrees, but will be referred to as a 30 degree pipe joint so as to refer the joinder angle 61 that is introduced by the use of this pipe joint. Generally, a pipe joint with an x degree elbow will be referred to as an x−90 degree pipe joint, so as to refer to the joinder angle 61 that it introduces, rather than to the angle of its elbow.

Figure 7:
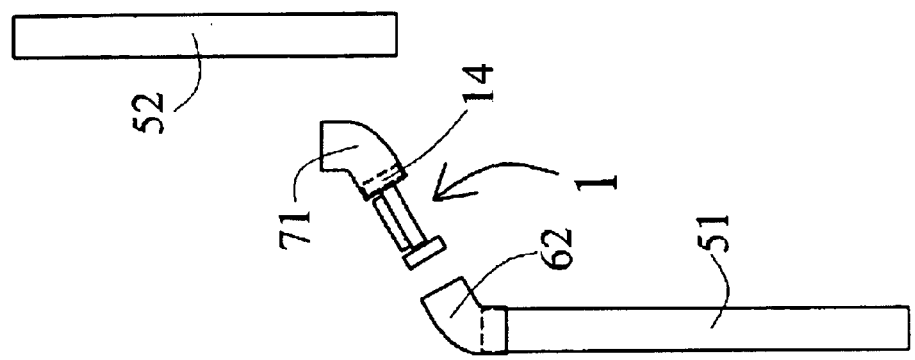
FIGS. 5 through 13 are plan views illustrating a preferred embodiment of the method by which the pipe fitting apparatuses of FIGS. 1 through 4 is used for pipe fitting, using the pipe fitting apparatus of FIGS. 3 and 4 as an example.

Turning now to FIG. 7, a second pipe joint 71 is mated with second pipe joint fitting 14 of pipe fitting apparatus 1 (shown fully contracted). This mating is achieved by screwing the screw threads of second pipe joint fitting 14 into screw threads of second pipe joint 71, if threads are available. Alternatively, second pipe joint fitting 14 is slid over second pipe joint 71 and temporarily but firmly secured in place by the rubber, plastic, cork, or similar material used to fabricate pipe joint fittings 14.

Figure 8:
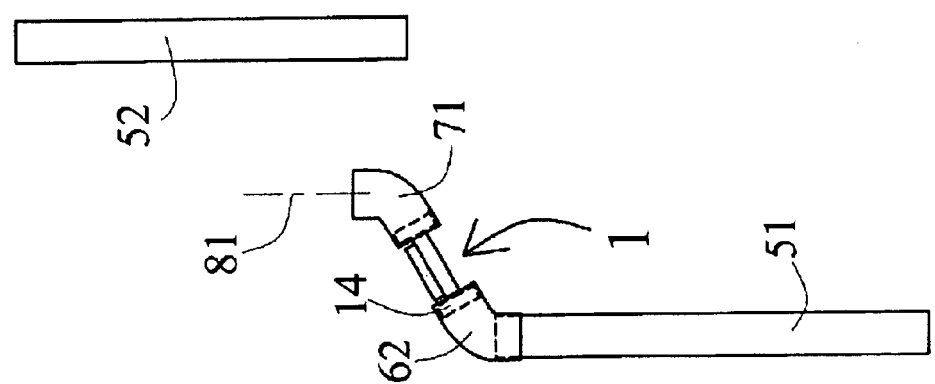

Next, in FIG. 8, the combination of pipe fitting apparatus 1 and second pipe joint 71 arrived at in FIG. 7 is mated with first pipe joint 62 using first pipe joint fitting 14 of pipe fitting apparatus 1. Similarly to FIG. 7, this mating is achieved by screwing the screw threads of first pipe joint fitting 14 into screw threads of first pipe joint 62, again assuming these threads are available. Alternatively, first pipe joint fitting 14 is slid over first pipe joint 62 and again temporarily but firmly secured in place by the rubber, plastic, cork, or similar material used to fabricate pipe joint fittings 14. It will be recalled that if pipe joint fittings 14 comprise the screw threading, then pipe joint fittings 14, linear measuring device 10, and telescoping sections 11 are all interconnected with one another such that pipe joint fittings 14 can be separately rotated (screwed) relative to one another. The reason for this is to allow first pipe joint fitting 14 to be screwed into first pipe joint 62 independently of the screwing of second pipe joint fitting 14 together with second pipe joint 71. FIG. 8 also illustrates a second pipe joint axis 81 denoting the center line of the vertically oriented region second pipe joint 71, as shown.

It is to be observed, while FIGS. 6, 7 and 8 show a particular sequence of steps, that there is a fair amount of flexibility in the order in which these steps can be performed. Thus, for example, not limitation, pipe fitting apparatus 1 can first be mated with first pipe joint 62 as in FIG. 8, and then mated with second pipe joint 71 as in FIG. 7. Alternatively, first pipe joint 62 can first be mated with pipe fitting apparatus 1 as in FIG. 8, and then mated with first pipe-to-be-joined 51 as in FIG. 6. Alternatively, both pipe joints 62 and 71 can be mated with pipe fitting apparatus 1 as in FIG. 8 before first pipe joint 62 is mated with first pipe-to-be-joined 51 as in FIG. 6. In sum, the steps of FIGS. 6, 7 and 8 leading to the configuration of FIG. 8 can be performed in any desired sequence within the scope of this disclosure and its associated claims, so long as ultimately they do lead to the configuration of FIG. 8, and particularly, to the illustrated interconnection of first pipe-to-be-joined 51, first pipe joint 62, pipe fitting apparatus 1, and second pipe joint 71.

It is to be noted that pipe fitting apparatus 1 can certainly be reversed so that first pipe joint fitting 14 is mated with second pipe joint 71 and second pipe joint fitting 14 is mated with first pipe joint 62, within the scope of this disclosure and its associated claims. As such, the use of the terms "first" and "second" in this context is simply for reference, and does not have any limiting impact on the scope of this disclosure and its associated claims.

Figure 9:
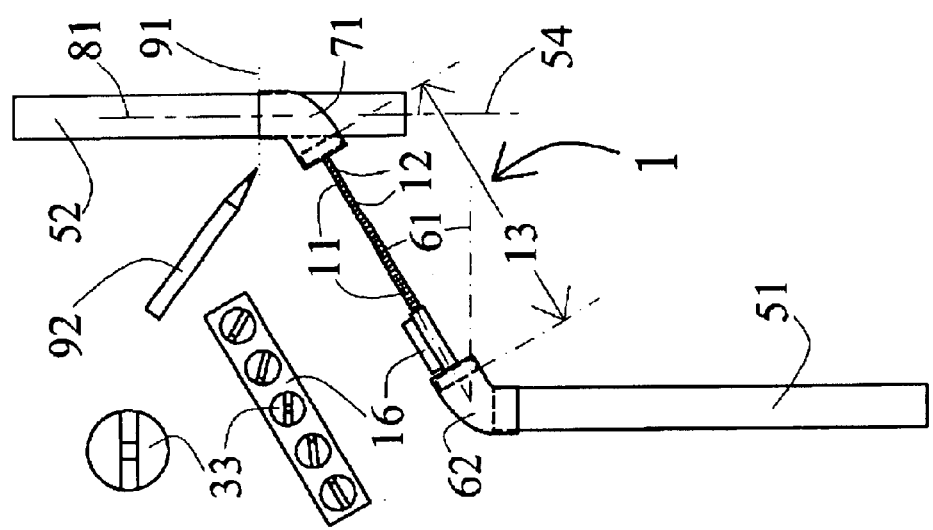

Next, in FIG. 9, the telescoping sections 11 of pipe fitting apparatus 1 are extended until second pipe joint 71 and second pipe-to-be-joined 52 become laterally aligned along their respective axes 81 and 54 such that the outside surface of second pipe joint 71 substantially contacts the outside surface of second pipe-to-be-joined 52, as shown. Simultaneously, during this extension, pipe fitting apparatus 1 is maintained at the selected joinder angle 61 by ensuring that angle measuring device 16 continues to read at the correct joinder angle 61—in this example, 30 degrees as indicated by the centered plumb bubble of 30-degree angle indicator 33. Also simultaneously, the complete interconnection of first pipe-to-be-joined 51, first pipe joint 62, pipe fitting apparatus 1, and second pipe joint 71 arrived at in FIG. 8 is maintained fully intact.

As a consequence of all the aforementioned steps, the top open end of second pipe joint 71 will rest against second pipe-to-be-joined 52 at an alignment line 91 substantially precisely where it needs to be aligned for proper joinder with second pipe-to-be-joined 52 at the selected joinder angle 61. Thus, the location of this alignment line 91 is marked on second pipe-to-be-joined 52 using a suitable marking implement 92.

Simultaneously, also as a consequence of all the aforementioned steps, the length 13 of pipe fitting apparatus 1 from one end to the other—particularly the length 13 between the outer ends of pipe joint fittings 14—will be extended to substantially precisely the length that the connecting pipe (101 in FIG. 10) needs to be cut in order to laterally connect first pipe joint 62 and second pipe joint 71 to one another. This length 13 established during the operations illustrated by FIG. 9 will be referred to as the "extended" length 13 of pipe fitting apparatus 1, to be distinguished from the maximum extended length 13 of pipe fitting apparatus 1 illustrated in FIGS. 2 and 4. Following this extension, it is possible to use distance determination means 12 such as the illustrated linear marking rules for determining extended length 13, and thus ascertaining the length to which connecting pipe 101 needs to be cut.

Figure 10:
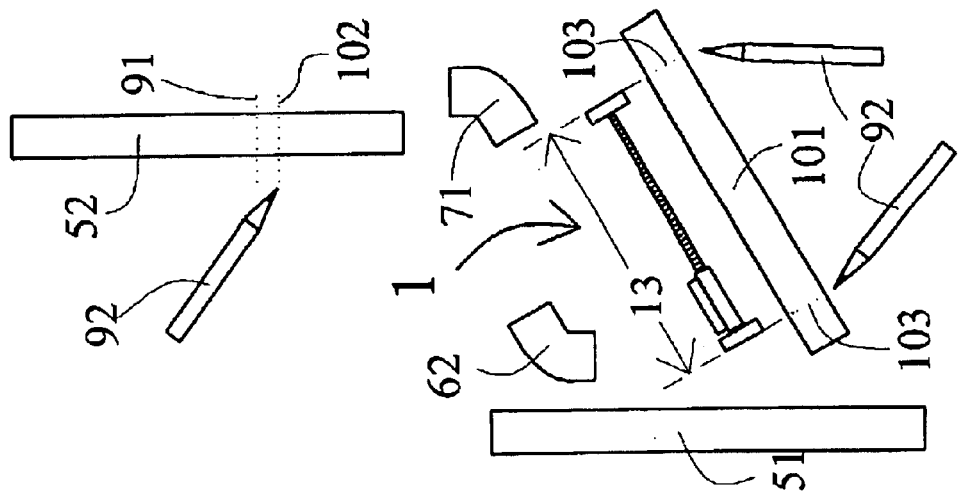

At this point, everything is disassembled as shown in FIG. 10. In particular, pipe fitting apparatus 1 is disassembled from first pipe joint 62 and second pipe joint 71. However, if the extended length 13 of pipe fitting apparatus 1 has not yet been ascertained, it is important during disassembly not to extend or contract pipe fitting apparatus 1 until this length has been ascertained. Thus, while the at least one telescoping section 11 should expand and collapse easily when this is intended, it preferably should also maintain sufficient friction in any given state of expansion so that the length of pipe fitting apparatus 1 will not be changed in response to minor, unintentional forces which might impinge upon pipe fitting apparatus 1 during this disassembly.

Because alignment line 91 has now been marked 92 on second pipe-to-be-joined 52, a second pipe cut line 102 at a slight linear distance from alignment line 91 may also be ascertained and marked 92, with reference to said alignment line 91. Essentially, this slight linear distance between alignment line 91 and second pipe cut line 102 will be substantially equal to whatever length of second pipe-to-be-joined 52 needs to be used to mate inside of second pipe joint 71 when the final plumbing connections are made.

Because pipe fitting apparatus 1 is now the same length that connecting pipe 101 that needs to be cut to in order to laterally connect first pipe joint 62 and second pipe joint 71 to one another, connecting pipe 101 may also be marked 92 for cutting at one or two suitable connecting pipe cut lines 103. (Although two connecting pipe cut lines 103 are illustrated, it is trivially obvious that connecting pipe 101 can be marked for only a single cut if a preexisting end of connecting pipe 101 is to be used as one of the two ends of connecting pipe 101 after it is cut.) The measurement of connecting pipe 101 for marking and cutting can be taken indirectly, by reading the extended length 13 of pipe fitting apparatus 1 from distance determination means 12, and then using a separate linear measuring device (not shown) to establish a suitable cut line or line 103 on connecting pipe 101 based on this measurement. Or, if extended length 13 is properly maintained during disassembly, this measurement can be taken directly, simply by resting pipe fitting apparatus 1 proximate connecting pipe 101 as illustrated in FIG. 10. In either event, indirectly or directly, the length to which connecting pipe 101 must be cut is easily established with reference to extended length 13 of pipe fitting apparatus 1.

Figure 11:
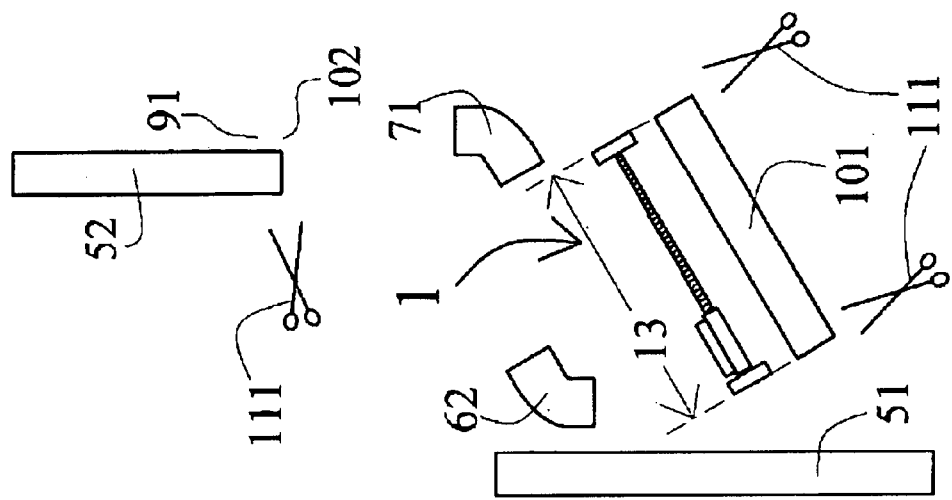

Turning now to FIG. 11, now that second pipe cut line 102 has been marked 92, second pipe-to-be-joined 52 is simply cut 111 along second pipe cut line 102, using cutting tools and methods ordinarily used in the art. Similarly, now that one or two connecting pipe cut lines 103 have been marked 92, connecting pipe 101 is also simply cut 111 along these one or two connecting pipe cut lines 103, also using cutting tools and methods ordinarily used in the art. The cut end of second pipe-to-be-joined 52 proximate 102 is prepared for mating with second pipe joint 71 using mating preparation tools and methods ordinarily used in the art. The cut ends of connecting pipe 101 proximate 103 are also prepared for mating with first pipe joint 62 and second pipe joint 71 using mating preparation tools and methods ordinarily used in the art.

Although the foregoing discusses the cutting of only second pipe-to-be-joined 52, it is an obvious variation and within the scope of this disclosure and its associated claims to cut both first pipe-to-be-joined 51 and second pipe-to-be-joined 52. The method discussed beginning with FIG. 5 assumes, however, that first pipe-to-be-joined 51 has already been cut to its desired length, and now needs simply to be interconnected with second pipe-to-be-joined 52.

Figure 12:
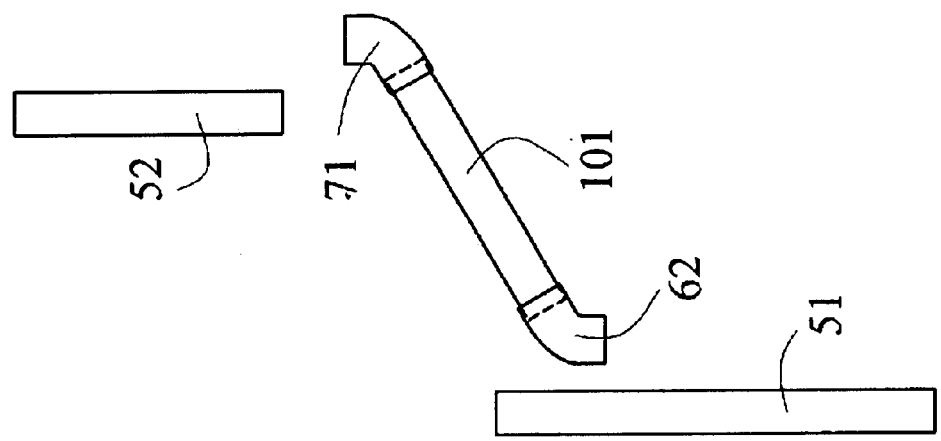

At this point, pipe fitting apparatus 1 has served its purpose, and the joining of first pipe-to-be-joined 51 with second pipe-to-be-joined 52 proceeds using all of the usual tools and methods ordinarily used in the art. Connecting pipe 101, now cut to the correct length, is joined with first pipe joint 62 and second pipe joint 71 as shown in FIG. 12. First pipe joint 62 and second pipe joint 71 are further connected with first pipe-to-be-joined 51 and second pipe-to-be-joined 52, now cut to its correct length. The resulting final configuration is the fully interconnected pipe network section 130 illustrated in FIG. 13.

Figure 13:
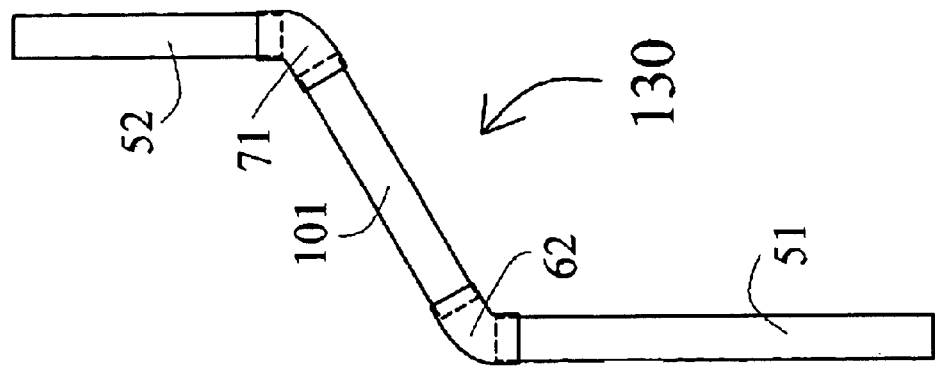

Of course, different practitioners may perform the steps of assembling first pipe-to-be-joined 51, first pipe joint 62, connecting pipe 101, second pipe joint 71, and second pipe-to-be-joined 52 in different ways within the scope of this disclosure and its associated claims, and may not necessarily follow the particular sequence of FIGS. 12 and 13 as illustrated. The particular order of steps chosen for this assembly is not relevant, so long as the final result is the interconnected pipe network section 130 of FIG. 13.

As a consequence of the foregoing, it becomes possible to easily measure and determine where to cut first pipe-to-bejoined 51 and/or second pipe-to-be-joined 52, and simultaneously to easily measure and determine how long to cut lateral connecting pipe 101 to interconnect first pipe-to-be-joined 51 and or second pipe-to-be-joined 52, at the selected joinder angle 61.

As a consequence of the foregoing, it also becomes possible to account fully for the geometric size and configuration of first pipe joint 62 and second pipe joint 71 in performing the aforementioned cuts, since these pipe joints themselves are integrally incorporated into the foregoing measurement method by virtue of their attachment to pipe joint fittings 14 of pipe fitting apparatus 1 during this measurement method.

Figure 14:
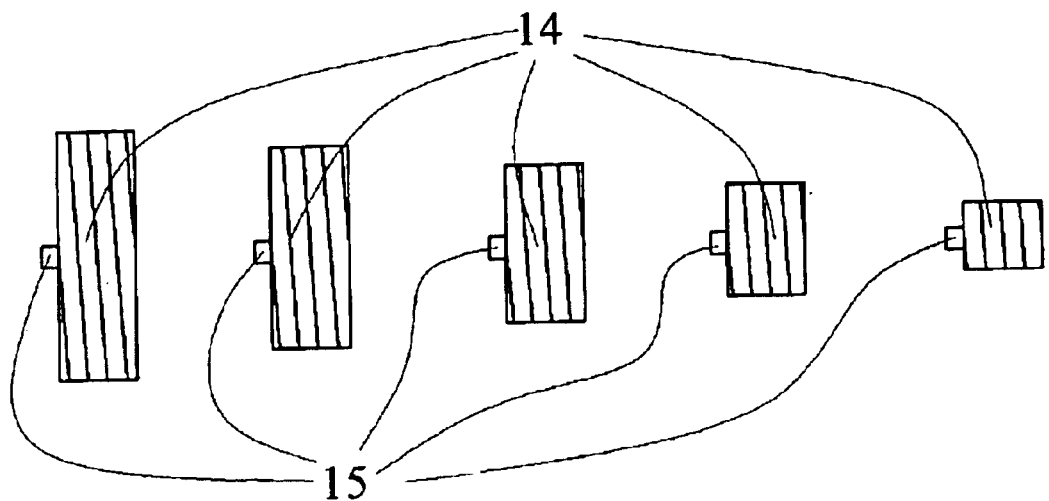
FIGS. 14 and 15 are plan views illustrating alternative embodiments for the pipe joint fittings on the ends of the pipe fitting apparatus of FIGS. 1 through 4, so as to accommodate pipes and pipe joints of various widths.

It will be noted that pipe joint fittings 14 as heretofore illustrated can be mated with only one width of pipe. A number of options are available for pipe fitting apparatus 1 to easily accommodate a wide variety of pipe and pipe joint widths, as is desired. FIG. 14 illustrates an embodiment comprising a plurality of modular, varying-width pipe joint fittings 14. Each of these pipe joint fittings 14 attaches 15 to the ends of pipe fitting apparatus 1, particularly to the open end of linear measuring device 10 (left side of FIGS. 2 and 4) and the outermost (rightmost in FIGS. 2 and 4) telescoping section 11, in a modular, removable manner. This removable attachment 15 can employ any of a variety of devices and methods known in the attachment arts which are suitable for modularly attaching pipe joint fittings 14 to the ends of the remainder of pipe fitting apparatus 1. What is important here is the modularity of attachment 15 to accommodate a variety of pipe joint fitting 14 widths, and not the particular devices and methods chosen to implement such modular attachment. This enables individual pipe joint fitting 14 modules to be selected and attached to pipe fitting apparatus 1 to accommodate the width of the particular pipes to be fitted in any given situation.

Figure 15:
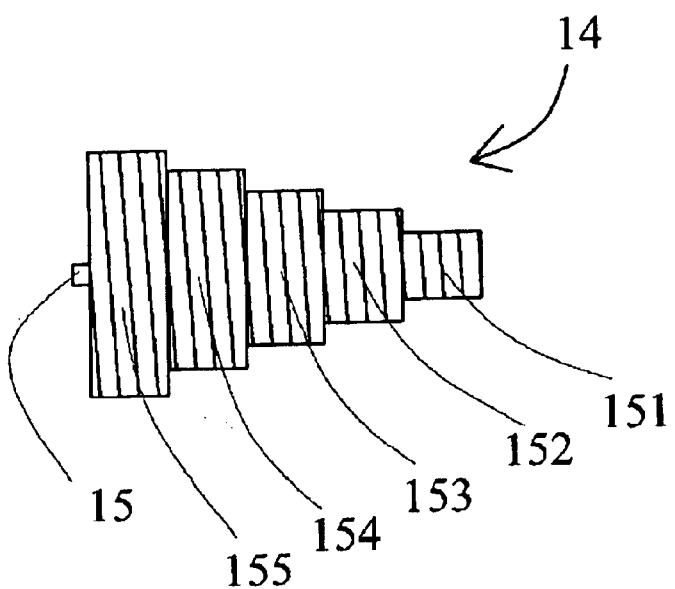

Alternatively, FIG. 15 illustrates an embodiment comprising a single pipe joint fitting 14 in turn comprising a plurality of stacked, varying-width sections 151, 152, 153, 154, and 155 as shown. In this embodiment, the width of each section is chosen to accommodate commonly-available pipe widths, so that pipe joint fittings 14 do not have to be removed and reattached every time pipe fitting apparatus 1 is to be used for a different pipe width. The illustration of five such sections, stacked as shown in FIG. 15, is for example only, and not limiting as to the number of sections or the configuration of these sections.

In the embodiment illustrated in FIG. 15, however, it is to be noted that the extended length 13 of pipe fitting apparatus 1 will vary depending upon which particular section 151, 152, 153, 154, or 155 is being employed, which, of course, correlates with which particular width of pipe is being fitted. Thus, if as was discussed earlier, the measurement of connecting pipe 101 for marking and cutting is taken indirectly, by reading extended length 13 of pipe fitting apparatus 1 from distance determination means 12, it is necessary to adjust any such measurement to account for the particular section 151, 152, 153, 154, or 155 being employed. If extended length 13 of pipe fitting apparatus 1 is properly maintained during disassembly, and this measurement is taken directly by resting pipe fitting apparatus 1 against connecting pipe 101 as illustrated in FIG. 10, then this is not of concern so long as the connecting pipe cut lines 103 are established with reference to the ends of the correct ones of sections 151, 152, 153, 154, or 155.

Combinations of FIGS. 14 and 15 are of course also considered within this disclosure and its associated claims.

Thus, for example, it might be desirable to provide a plurality of pipe joint fittings 14 as in FIG. 14, but with each such pipe joint fitting 14 in turn comprising a plurality of varying-width sections as in FIG. 15. For example, one or more such pipe joint fittings 14 might comprise metric-width sections, while others of such pipe joint fittings 14 might comprise non-metric-width sections.

While the foregoing discussion refers to "pipes" and "pipe joints," these terms are to be understood and interpreted broadly to refer generally to any type of conduits for which the use of pipe fitting apparatus 1 is suitable to aid in the interconnection of two laterally displaced such conduits.

Claimed herein are: the method of using pipe fitting apparatus 1 to measure pipes for connection; pipe fitting apparatus 1 itself; and a plumbing connections produced by the process of using pipe fitting apparatus 1 to measure pipes for connection.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A pipe fitting apparatus for measuring a linear distance and angular orientation between a first pipe-to-be-joined and a second pipe-to-be-joined, comprising:

first pipe joint fitting and mating means for fitting and mating with a first pipe joint;

second pipe joint fitting and mating means for fitting and mating with a second pipe joint;

extendable linear measuring means connected proximate two respective ends thereof with said first pipe joint fitting and mating means and said second pipe joint fitting and mating means, for linearly varying a distance between said first and second pipe joint fitting and mating means by extending said extendable linear measuring means; and angle measuring means secured to said extendable linear measuring means for substantially maintaining an angular reading at a preselected angle, while varying said distance between said first and second pipe joint fitting and mating means by extending said extendable linear measuring means.

2. The apparatus of claim 1, wherein said angle measuring means is further capable of being used to select said preselected angle, in addition to being capable of so-maintaining said angular reading at said preselected angle.

3. The apparatus of claim 1, further comprising distance determination means for determining said distance between said first and second pipe joint fitting and mating means.

4. The apparatus of claim 1, said extendable linear measuring means further comprising at least one telescoping section for so-extending said pipe fitting apparatus.

5. The apparatus of claim 1, said extendable linear measuring means comprising a substantially rigid construction.

6. The apparatus of claim 1, said angle measuring means comprising gravitationally-based means for measuring angles along a continuous range of angles.

7. The apparatus of claim 1, said angle measuring means comprising gravitationally-based means for measuring at least one discrete angle.

8. The apparatus of claim 1, said angle measuring means comprising gravitationally-based means for measuring at least one discrete angle preselected from an unrestricted, continuous range of angles.

9. The apparatus of claim 1, said first and second pipe joint fitting and mating means comprising screw threading.

10. The apparatus of claim 1, said first and second pipe joint fitting and mating means comprising a material which is firm and yet capable of a slight degree of compression with sufficient friction, such that:

when mating said first pipe joint fitting and mating means to said first pipe joint and said second pipe joint fitting and mating means to said second pipe joint, said first and second pipe joint fitting and mating means are capable of being slid easily yet firmly into said first and second pipe joints, by hand; and while so-extending said pipe fitting apparatus and establishing said alignment line, said first and second pipe joint fitting and mating means are capable of remaining securely mated with said first and second pipe joints.

11. The apparatus of claim 1, said first and second pipe joint fitting and mating means comprising a material selected from the material group consisting of at least one of: rubber, plastic, and cork.

12. The apparatus of claim 1, said pipe joint fitting and mating means comprising a plurality of modular, varying-width pipe joint fitting and mating means each corresponding and mating with a distinct width of pipe joint.

13. The apparatus of claim 1, said pipe joint fitting and mating means comprising a plurality of varying-width sections each corresponding and mating with a distinct width of pipe joint.

\* \* \* \* \*